United States Patent [19]

Royle

[11] Patent Number: 5,417,728
[45] Date of Patent: May 23, 1995

[54] REVERSE FLUSH GAS VALVE

[75] Inventor: Eric E. Royle, Wigston, England

[73] Assignee: European Gas Turbines Limited, United Kingdom

[21] Appl. No.: 151,566

[22] Filed: Nov. 12, 1993

[30] Foreign Application Priority Data

Nov. 27, 1992 [GB] United Kingdom ................ 9224923

[51] Int. Cl.6 ............................................. B01D 46/00
[52] U.S. Cl. ........................................ 55/302; 55/523; 137/239
[58] Field of Search ............... 55/302, 523; 96/113, 96/116, 117, 174; 137/239

[56] References Cited

U.S. PATENT DOCUMENTS

| 3,778,967 | 12/1973 | Kauer et al. | 96/113 X |
| 3,937,622 | 2/1976 | Hewitt et al. | 96/113 |
| 4,655,799 | 4/1987 | Bosworth et al. | 55/302 X |

FOREIGN PATENT DOCUMENTS 1064746 4/1967 United Kingdom .
1243231 8/1971 United Kingdom .
1290786 9/1972 United Kingdom .

Primary Examiner—Charles S. Bushey
Attorney, Agent, or Firm—Kirschstein, Ottinger, Israel & Schiffmiller

[57] ABSTRACT

A gas valve which has provision for a reverse flow pulse of high pressure gas. The valve includes a reservoir which is loaded with high pressure gas during normal operation which is released into the main flow path by an applied pressure reduction. The valve is fitted to a porous ceramic "candle" filter between dirty and clean gas zones. The high pressure gas pulse reverses flow through the filter and blows off any aggregated dirt. A shut-off valve is arranged to shut the valve in the event the ceramic filter breaks. The valve is efficient and uses only a metered amount of high pressure gas with little loss of pressure between supply and flushing.

15 Claims, 2 Drawing Sheets

REVERSE FLUSH GAS VALVE

BACKGROUND OF THE INVENTION

This invention relates to a gas valve particularly for use in association with a gas filter of a kind which is periodically flushed, i.e., cleaned, by providing a reverse flow pulse of gas through it.

Such filters are known in the field of gas turbines where the working fluid includes combustion products at high temperatures and it is vital to exclude combustion particles since they can seriously damage turbine blading. So-called candle filter elements are commonly employed, these each consisting of a porous ceramic tube closed at one end which projects into the 'dirty' gas zone. The dirty gas is driven through the filter by a pressure differential leaving the dirt adhering (largely) to the filter surface.

It is known in such systems to reverse flush the filter by applying a pulse of high pressure gas to the inside of the filter element. The dirt is blown off the filter surface and falls to the bottom of the container or pressure vessel where it is collected and disposed of.

The reverse pulse of gas is obtained from the clean gas side of the filter. It is cooled then compressed to a very high pressure and reheated and stored in a reservoir.

The gas pulse is then passed through an external pulsing valve to a nozzle at the entrance to a venturi at the neck of the outlet side of the filter element holder.

The reverse flush valve is opened and shut very quickly (usually under 1 second) and a pulse of gas is fed to the nozzles. One valve can normally supply 10 nozzles.

The pulse of gas leaves the nozzle and enters the venturi where it entrains clean gas and after going through the venturi enters the bore of the ceramic element.

The pulse wave generated then causes reverse flow through the walls of the element and produces a shock wave on the caked dirt sufficient to break it away ready for collection at the bottom of the vessel.

The intensity of the pulse inside the element is, however, minute compared to the initial pressure in the reservoir and the system is very inefficient.

A further problem that arises in such systems is that, in the event of the filter element breaking off, dirty gas is allowed to pass directly through the venturi and to enter the gas turbine. This dirt has a very detrimental effect on the fuel control valves and the turbine blading.

SUMMARY OF THE INVENTION

It is an object of the invention to provide a more efficient reverse flush gas valve.

According to the present invention, a reverse flush gas valve for providing normal gas flow in one direction and pulsed high pressure gas flow in the reverse direction comprises a chamber having entry and exit ports arranged to be open alternatively, a reservoir connected to the chamber through the entry port, means for filling the reservoir with high pressure gas while the entry port, is closed, to obtain a metered volume of high pressure gas, and means for closing the exit port opening the entry port and exposing the chamber to the metered volume of high pressure gas in the reservoir.

The means for filling the reservoir is preferably such as to effect closure of the entry port. The entry port and the exit port are adapted to be closed and opened respectively by piston means subject to the high pressure gas.

There may be included a control port providing access to the reservoir for high pressure gas, the reservoir being sealed from the control port by the piston means, except for a bleed path by-passing the piston means.

The valve may comprise a cylindrical housing, a coaxial hollow cylinder slidable axially within the housing and enclosing the chamber, the reservoir being formed between the housing and the hollow cylinder, and the hollow cylinder being slidable in one direction to open the entry port and close the exit port and in the other direction to close the entry port and open the exit port, and further having external circumferential piston means which engages the housing and substantially closes one end of the reservoir. One end of the hollow cylinder may be adapted to engage the housing to provide the closed condition of the entry port, the exit port being provided by one or more holes in a portion of the housing wall in which the hollow cylinder is a sliding fit, the holes being exposed by movement of the hollow cylinder to close the entry port.

There may be included shut-off means for the exit port, the shut-off means being biased to close the exit port subject to inhibiting means dependent on the physical integrity of said chamber. The shut-off means may comprise a cylindrical plug which is slidably mounted in the portion of the housing wall and is operable to fall under gravity to a position in which the exit port is closed, the cylindrical plug being prevented from falling under gravity by a member which is supported by the remote wall of the chamber. The member preferably comprises a rod which extends from the plug axially through the hollow cylinder to the remote wall of the chamber.

The chamber may be formed partly by a frangible filter member and the remote wall of the chamber provided by the filter member. The filter member may be of tubular form closed at one end and the rod may be weighted at its end adjacent the remote wall to assist movement of the cylindrical plug under gravity.

According to another aspect of the invention, a reverse flushing gas filter system includes a valve as aforesaid, means for applying high pressure gas to the control port to fill the reservoir with high pressure gas by way of the bleed path, means responsive to gas pressure in the reservoir to vent the high pressure gas from the control port to cause the piston means to drive the hollow cylinder to open the entry port and close the exit port, thereby exposing the chamber and the filter member to a pulse of high pressure gas effective to reverse flush the filter means.

Means may be provided for supplying high pressure gas to the control port and venting the control port alternately in response to differential gas pressure thresholds, whereby to apply a series of high pressure gas pulses to reverse flush the filter means.

BRIEF DESCRIPTION OF THE DRAWING

A reverse flush gas valve in accordance with the invention will now be described, by way of example, with reference to the accompanying drawing, FIGS. 1 and 2 showing two embodiments of a section through the valve and filter attached to it.

DETAILED DESCRIPTION OF THE PREFERRED EMBODIMENT

Figure 1:
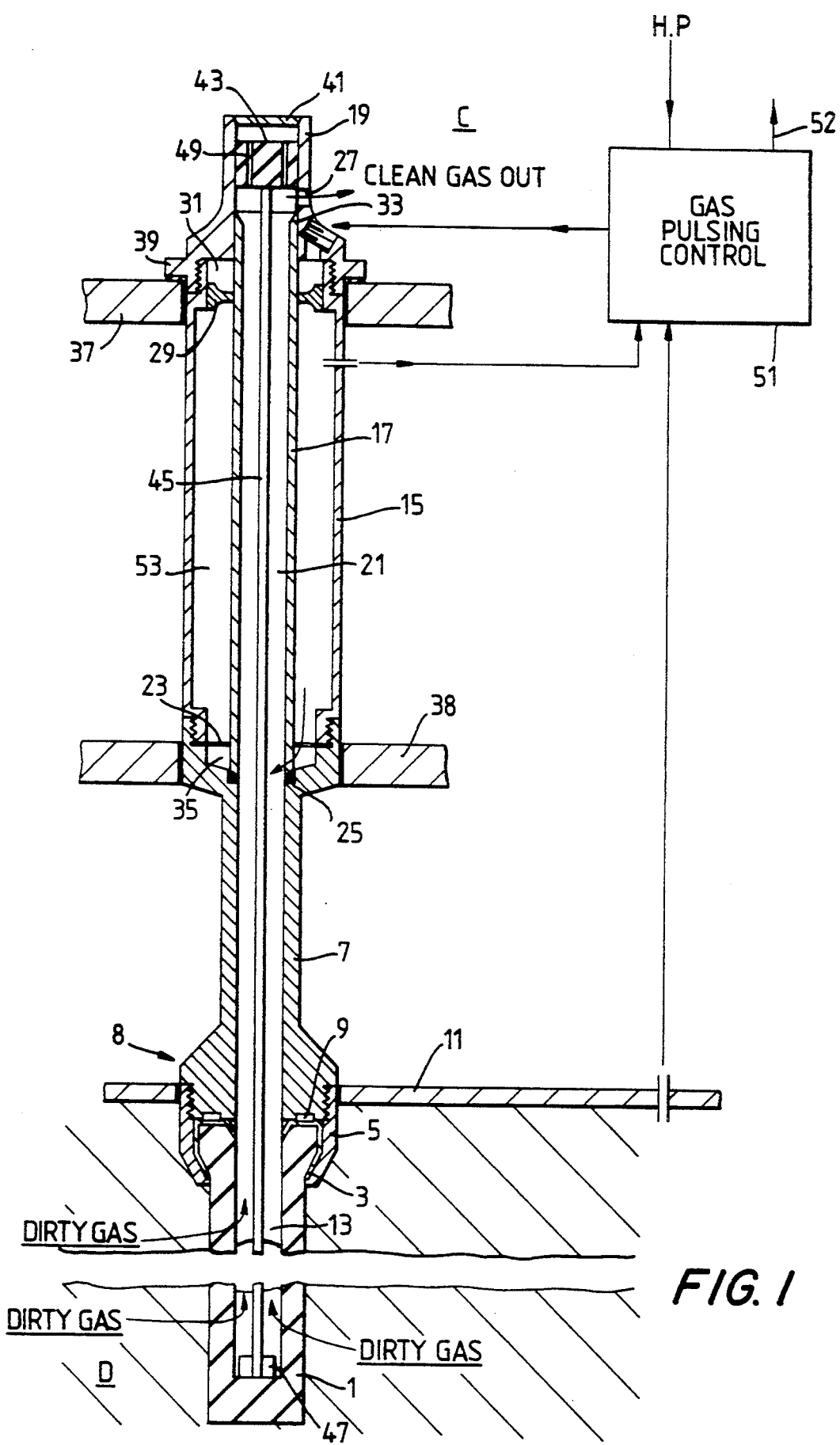

A 'candle' filter element 1 consists of a cylindrical tube of porous ceramic material having one end closed. The open end is belled out for ease of fixing and is cased in, first a temperature resistant gasket 3, and then a skin of stainless steel (not distinguishable) for protection since the filter is of frangible material. A collar 5 is fitted over the filter and engages the belled out portion, the collar being screwed to an extension of a valve body 7 to form a coupling 8. The encased end of the filter element 1 is thus pulled into engagement with the valve body 7 and a seal is achieved. The sealing face of the valve housing has an annular recess 9 which accommodates a wave spring to provide some compliance in the coupling 8. The coupling 8 extends through and is located and supported by wall 11 in the dirty gas region D.

The valve comprises a three-part valve body: the lower part 7 coupled to the filter element; a central part 15 containing the valve gate 17; and an upper part 19 forming a guide for the valve gate 17. A chamber 21 extends through all three parts of the valve body and is continuous with the space 13 within the filter element 1. Thus, dirty gas from the region D is filtered through the filter element and becomes clean gas in this chamber 21.

In the embodiment shown, the valve extends through three walls: wall 37 to which it is sealed and which separates clean, filtered gas above the wall from dirty, unfiltered gas below; wall 38 which surrounds and supports the coupling between the central valve body portion 15 and the lower body portion 7; and wall 11 referred to above. The valve is sealed to the upper wall 37 but only supported/located by the lower two walls 38 and 11. In an alternative arrangement the valve might be sealed to wall 38 or 11 instead and only located by wall 37. Clearly, the separation of clean and dirty gas occurs at the sealing wall.

In the central valve body portion 15, the chamber 21 is defined by the valve gate 17, a hollow cylinder which is slideable axially. Movement of the valve gate 17 is guided at its upper end by the valve body 19 itself, and at its lower end by an annular plate 23 which is fitted between the central and lower valve body parts 15 and 7, these being screwed together. The plate 23 has a number of holes around the central aperture to permit the passage of gas during a flushing operation, as will be explained.

The valve gate is shown in its downward position in which its lower end engages and seals against an annular sealing 25. In the wall of upper valve body 19 are one or more holes 27 which form an exit port from the chamber 21 into a clean gas zone.

The cylindrical valve gate 17 is fitted at its upper end with an annular piston 29 fixed around the outer surface of the valve gate. This piston engages the inner wall of the centre valve body 15 to define a small enclosed volume 31 between the piston and the upper valve body 19. Access to this volume 31 is provided by a control port 33 in the upper valve body 19.

In the upper position of the valve gate 17, the exit port 27 is closed by the valve gate and a passage, constituting an entry port 35, is provided into the chamber 21 between the lower end of the valve gate 17 and the seating 25. Upward movement of the valve gate is limited by the abutment of the piston 29 against the upper valve body 19.

The whole valve and filter element is mounted in an aperture in the upper wall 37 by means of a flange 39 on the upper valve body 19, the flange being screwed to the wall with an intervening seal.

A shut-off valve for use in case of accidental damage is provided as follows. The upper valve body 19 has a cylindrical bore closed off by a blanking cap 41. In the bore is a cylindrical plug 43 which is a close but freely sliding fit. At the lower end of its travel the plug 43 closes off the exit port 27. In normal operation the plug 43 is held in its upper position, leaving the exit port 27 open, by a rod 45 which is fixed to the plug and extends axially through the chamber 21 to the remote wall of the chamber provided by the closed end of the filter element 1. A weight 47 is fixed to the bottom of the rod 45 the weight being a loose fit in the bore of the filter but serving to centre the rod. In the event of the filter element breaking, losing its physical integrity, i.e. in operation, the rod 45 will fall under its own weight and that of the weight 47 and will consequently no longer support the shut-off plug 43. This plug 43 will fall until it is stopped by the valve gate 17, in which position it closes off the exit port 27. No dirty gas can then vent to the clean gas zone above the valve.

Since the space above the shut-off plug 43 is closed off a partial vacuum would be formed to prevent the shut-off plug working. This problem is overcome by providing holes 49 through the plug parallel to the axis.

Figure 2:
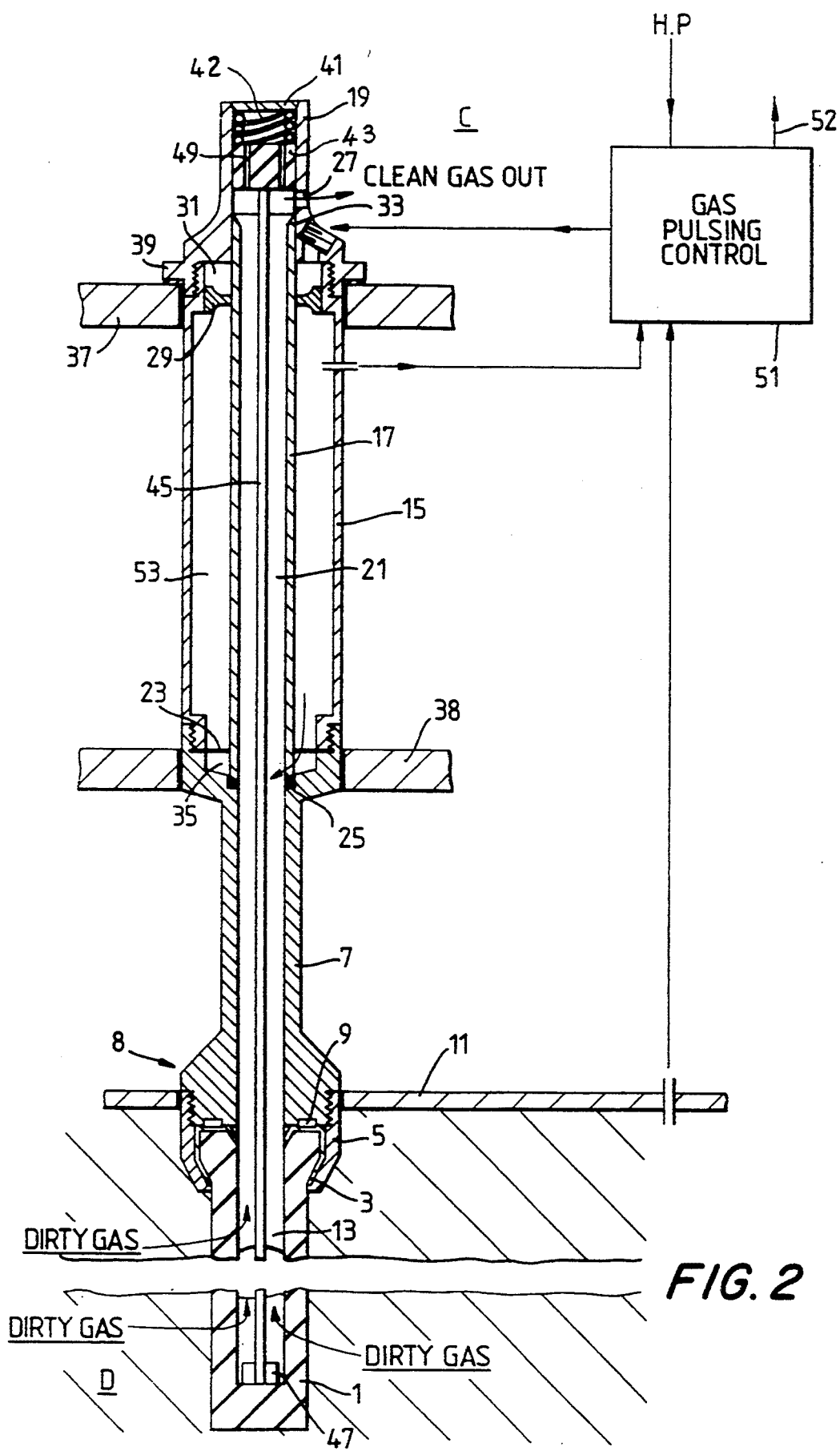

The valve has been described in the orientation illustrated, in which gravity operates the shut off valve. If the valve is required to operate in some other orientation a spring 42 (FIG. 2) may be used to bias the plug 43 towards its shut-off position. In this case the weight 47 is redundant but still has its centering function.

In operation of the reverse flush valve, the exit port 27 is normally open, the entry port 35 closed and the path of filtered gas is from the inside surface of the filter element 1, up the chamber 21 to the exit port 27 at the top. The shut-off plug 43, rod 45 and weight 47 play no part in normal operation.

When it is required to perform a filter flushing operation, which may be initiated manually, a high pressure (e.g., 50 bar) gas supply is applied to the control port 33 from control equipment 51. This high pressure gas (which is obtained from the clean gas zone) acts upon the piston 29 so, initially at least, bedding the valve gate 17 on to its seating 25. The piston 29 is an imperfect fit in the valve body and in effect provides a bleed path into the space between the valve body 15 and the valve gate cylinder 17. This space fills up after a short time with high pressure gas and provides, as will be seen, a fixed volume reservoir 53 dispensing a metered quantity of high pressure gas.

Filtered gas passing through the chamber 21 will normally be at a fairly high temperature, having (typically) arisen from a gas generator employing a combustion process. The high pressure gas occupying the reservoir 53 is normally at a lower temperature, having been derived from the clean gas region C which has had time to cool. If the filter element were suddenly exposed to cool high pressure gas there would be a danger of thermal shock and fracture. The valve gate 17 is metallic and a good conductor so that the cool high pressure gas in the reservoir 53 is heated by the hot filtered gas through the wall of the metallic cylinder. The surface area is fairly great compared to the gas volume so that good thermal transfer is achieved albeit for the short time the high pressure gas is in the reservoir 53.

Gas pressure in the dirty gas region D, in the clean gas region C, and in the reservoir 53 are monitored by the control system 51. Preferably, the above application of high pressure to the control port is initiated automatically, in response to the pressure differential across the filter element, detected between the dirty gas region D and the clean gas region C. This pressure differential is an indication of the extent to which the filter is clogged.

When the pressure in the reservoir is sufficient, as determined by a pressure threshold detector, the high pressure supply is shut off and the control port 33 vented (52) to the clean gas region C. The bleed path is not sufficient to equalise the pressure above and below the piston 29 quickly, and the piston and valve gate 17 are driven upwards by the reservoir pressure so closing the exit port 27 and opening the entry port 35. The metered quantity of high pressure gas in the reservoir 53 is suddenly released into the chamber 21 and the filter element is exposed to a high pressure pulse of reverse gas flow. Dirt collected on the outer surface of the filter element is subjected to the sudden high pressure and breaks off to fall to the bottom of the gas vessel and be collected subsequently.

As the reservoir pressure falls, a low differential pressure threshold causes the venting circuit to be replaced by the high pressure supply again and the process is repeated automatically. This cycle may be repeated until the pressure differential across the filter element falls to a sensed predetermined level.

It will be apparent that the intensity of the reverse flushing pulse can be varied by controlling the high pressure valve.

In the event of accidental breakage of the filter element the rod and weight fall down and pull the shut-off plug 43 down to close the exit port 27.

There are a number of advantages of the above described embodiment over and above known reverse flush systems.

1. The amount of pulse gas is metered.
2. The intensity of the pulse can be varied.
3. Only small bore valves are required, in contrast to conventional systems in which one valve services perhaps 10 filter elements and is consequently of large bore.
4. Pre-heating of the gas is not required as heating is done while in the valve body, by contact with the valve gate cylinder.
5. Reduction of thermal shock on the filter element because the flushing gas is always close to the dirty gas temperature.
6. Provision is made for valve closure on filter element failure.
7. As there is one valve per filter element the effect of one valve failure is minimal.
8. The complete valve and element can be removed for maintenance as one unit and replaced as such.
9. The operation of the external control valve is not time critical as in conventional system. There is an almost instantaneous reaction to releasing the reservoir gas into the flow chamber. Conventional pulse valves are remote from the filter elements (since they serve several elements) and there is consequently a time delay and pulse velocity reduction.
10. The pulsing gas supply is at low temperature so low grade valves can be used.
11. The power supply for controlling the external valves is small compared to that for the conventional reverse flush valves.
12. The main reverse flush valve is powered by its own internal gas pressure.
13. By suitable mounting the reverse flush valve could be increased in size to serve more than one element.
14. The pulse pressure generated is substantially greater than that by the conventional system from a comparable source.
15. The amount of purging gas used per cycle is only about 1/10 of that in a conventional purge system.

I claim:

1. A reverse flush gas valve for providing normal gas flow in one direction and pulsed high pressure gas flow in the reverse direction, the valve comprising: a chamber having entry and exit ports arranged to be open alternatively; a reservoir connected to said chamber through the entry port; means for filling the reservoir with high pressure gas while the entry port is closed to obtain a metered volume of high pressure gas, said filling means being operative to effect closure of the entry port; means for closing the exit port, opening the entry port, and exposing the chamber to the metered volume of high pressure gas in the reservoir; and piston means subject to the high pressure gas for closing and opening the entry port and the exit port, respectively.

2. A valve according to claim 1, including a control port providing access to the reservoir for high pressure gas, the reservoir being sealed from the control port by said piston means, except for a bleed path by-passing the piston means.

3. A valve according to claim 2, and comprising a cylindrical housing, a coaxial hollow cylinder slidable axially within the housing and enclosing said chamber, the reservoir being formed between the housing and the hollow cylinder, the hollow cylinder being slidable in one direction to open the entry port and close the exit port and in the other direction to close the entry port and open the exit port, the hollow cylinder having external circumferential piston means which engages the housing and substantially closes one end of the reservoir.

4. A valve according to claim 3, wherein one end of the hollow cylinder is adapted to engage the housing to provide the closed condition of the entry port, the exit port being provided by one or more holes in a portion of the housing wall in which said hollow cylinder is a sliding fit, said holes being exposed by movement of said hollow cylinder to close the entry port.

5. A valve according to claim 4, including shut-off means for said exit port, said shut-off means being biased to close the exit port subject to inhibiting means dependent on the physical integrity of said chamber.

6. A valve according to claim 5, wherein said shut-off means comprises a cylindrical plug which is slidably mounted in said portion of the housing wall and is operable to fall under gravity to a position in which said exit port is closed, the cylindrical plug being prevented from falling under gravity by a member which is supported by a remote wall of the chamber.

7. A valve according to claim 5, wherein said shut-off means comprises a cylindrical plug which is slidably mounted in said portion of the housing wall and is operable to move under spring bias, in any orientation of the valve, to a position in which said exit port is closed, the cylindrical plug being prevented from moving under said spring bias by a member which is supported by a remote wall of the chamber.

8. A valve according to claim 6, wherein said member comprises a rod which extends from said plug axially through said hollow cylinder to said remote wall of the chamber.

9. Valve according to claim 5, wherein said chamber is formed partly by a frangible filter member.

10. A valve according to claim 6, wherein said remote wall of the chamber is provided partly by a frangible filter member.

11. A valve according to claim 10, wherein the filter member is of tubular form closed at one end.

12. A valve according to claim 8, wherein said rod is weighted at its end adjacent said remote wall to assist movement of said cylindrical plug under gravity.

13. A valve according to claim 3, wherein said hollow cylinder provides a heat conduction path whereby high pressure gas in said reservoir is heated by gas in said chamber while said entry port is closed, to avoid thermal shock to any vulnerable part of said chamber.

14. In a reverse flushing gas filter system, a valve according to claim 9, means for applying high pressure gas to said control port to fill the reservoir with high pressure gas by way of said bleed path, means responsive to gas pressure in the reservoir to vent the high pressure gas from the control port to cause said piston means to drive said hollow cylinder to open said entry port and close said exit port, thereby exposing said chamber and said filter member to a pulse of high pressure gas effective to reverse flush the filter means.

15. In a gas filter system according to claim 14, means for supplying high pressure gas to said control port and venting said control port alternately in response to differential gas pressure thresholds, whereby to apply a series of high pressure gas pulses to reverse flush the filter means.

* * * * *